United States Patent
Imbourg et al.

(10) Patent No.: US 7,687,021 B2
(45) Date of Patent: Mar. 30, 2010

(54) METHOD OF FABRICATING A CASING FOR TURBINE STATOR

(75) Inventors: Sebastien Imbourg, Yerres (FR); Claude Mons, Savigny le Temple (FR); Philippe Pabion, Vaux le Penil (FR); Jean-Luc Soupizon, Vaux le Penil (FR)

(73) Assignee: Snecma, Paris (FR)

( * ) Notice: Subject to any disclaimer, the term of this patent is extended or adjusted under 35 U.S.C. 154(b) by 678 days.

(21) Appl. No.: 11/151,427

(22) Filed: Jun. 14, 2005

(65) Prior Publication Data
US 2006/0026833 A1 Feb. 9, 2006

(30) Foreign Application Priority Data
Jun. 15, 2004 (FR) .................................. 04 06469

(51) Int. Cl.
*B22F 7/00* (2006.01)
(52) U.S. Cl. ................. 419/8; 419/26; 419/49; 29/890.01; 29/889.2; 415/191; 415/213.1
(58) Field of Classification Search ................ 29/892.2; 419/8
See application file for complete search history.

(56) References Cited

U.S. PATENT DOCUMENTS

| | | | | |
|---|---|---|---|---|
| 4,183,456 A | * | 1/1980 | Schilling et al. | 228/175 |
| 4,383,854 A | | 5/1983 | Dembowski et al. | |
| 4,604,780 A | * | 8/1986 | Metcalfe | 29/889.22 |
| 5,399,066 A | * | 3/1995 | Ritchie et al. | 415/115 |
| 5,875,549 A | * | 3/1999 | McKinley | 29/889.2 |
| 6,767,182 B2 | * | 7/2004 | Coppola | 415/115 |
| 7,234,920 B2 | * | 6/2007 | Imbourg et al. | 415/213.1 |
| 2004/0018081 A1 | * | 1/2004 | Anderson et al. | 415/108 |
| 2004/0184912 A1 | * | 9/2004 | Crozet et al. | 415/191 |
| 2005/0000674 A1 | * | 1/2005 | Beddard et al. | 164/122.1 |

FOREIGN PATENT DOCUMENTS

EP 1 288 444 A1 3/2003

OTHER PUBLICATIONS

J.J. Conway and F.J. Rizzo, "Hot Isostatic Pressing of Metal Powders", ASM Handbook, vol. 7, pp. 605-620, 1998.*
R. Baccino, et al., "High Performance and High Complexity Net Shape Parts for Gas Turbines: the ISOPREC Powder Metallurgy Process", Materials and Design, vol. 21, 2000, XP-008044948, pp. 345-350.

* cited by examiner

*Primary Examiner*—Roy King
*Assistant Examiner*—Christopher Kessler
(74) *Attorney, Agent, or Firm*—Oblon, Spivak, McClelland, Maier & Neustadt, L.L.P.

(57) ABSTRACT

The invention provides a method of fabricating a turbine stator casing, the method comprising the operations consisting in: between the walls of portions of a mold, forming a cavity of shape corresponding to the shape of the shroud of said casing, securing soluble cores to at least one of said mold portions, said cores being held at a distance from the wall of said mold portion and representing empty spaces that are to be formed inside said shroud; putting soluble inserts into place between the cores to represent flow paths between said empty spaces; filling said cavity with a metal alloy powder; sintering said powder by hot isostatic pressing; eliminating the cores and the inserts by dissolving them; and extracting the shroud as molded in this way. The invention is applicable to fabricating a turbine stator casing for an airplane turbojet.

16 Claims, 3 Drawing Sheets

METHOD OF FABRICATING A CASING FOR TURBINE STATOR

The invention relates to a method of fabricating a stator casing for a turbine, and more particularly for an airplane turbojet turbine.

BACKGROUND OF THE INVENTION

Such a casing comprises a shroud of generally frustoconical shape which carries fastener hooks on its inside face, i.e. facing towards the inside of the turbine, for holding one or more turbine nozzles formed by rings or ring segments carrying stationary vanes. Rotary wheels carrying the moving blades of the turbine rotor are located between such nozzles. Each pair constituted by a nozzle and a rotary wheel constitutes a stage of the turbine.

Turbines, and more particularly airplane turbojet turbines, have very hot combustion gases passing through them at temperatures that can sometimes be as great as 1100° C. in certain turbine stages. The shroud of the casing is thus subjected to very significant heating and it is necessary to cool it using a cooling system.

The European patent application published under the No. 1 288 444 A1 gives an example of a cooling system constituted by perforated annular ducts that are fed with cool air and that surround the shroud. The cool air is blown against the outside face of the shroud, through the perforations in the ducts. Nevertheless, in practice, it has been found that such a cooling system requires equipment that is bulky and expensive and does not enable the heating of the shroud to be reduced significantly at its inside face.

In order to reduce the bulk of ducted cooling systems and improve the cooling of the inside face of the shroud, double-walled or double-skinned shrouds have been devised that present empty spaces between their inner and outer skins, and cool air is caused to flow through those spaces. In order to make such shrouds, use is made of conventional casting techniques using cores that are soluble. More precisely, a molten alloy is cast into a mold whose walls have the shape of the outlines of the shroud, with soluble cores being positioned inside the mold. Once the alloy has cooled and solidified, the shroud is extracted from the mold and is dipped in a basic dissolving bath so that the cores dissolve, thereby leaving free said empty spaces.

That method of manufacture nevertheless presents certain drawbacks associated with the very nature of manufacture by casting. Thus, it is difficult to control the dimensional precision of the shroud casting. In addition, mechanical properties such as elastic limit and fatigue resistance of the resulting shroud are not good, often because of its high degree of porosity or because of the presence of structural defects in its bulk that weaken it (these defects are often associated with the casting cooling in non-uniform manner).

OBJECTS AND SUMMARY OF THE INVENTION

The invention relates to a method of fabricating a turbine stator casing that enables double-skinned casing shrouds to be made with good dimensional precision, said shrouds also presenting good mechanical properties.

In its most general form, the invention provides a method of fabricating a turbine stator casing, said casing comprising a shroud, the method comprising the operations consisting in:

between the walls of portions of a mold comprising at least two portions, forming a cavity of shape corresponding to that of said shroud;

securing cores made of soluble material to at least one of said mold portions, said cores being held spaced apart from the wall of said mold portion and representing empty spaces that are to be provided inside said shroud;

filling said cavity with a metal alloy powder;

sintering said powder by hot isostatic pressing;

eliminating said cores by dissolving them; and extracting the shroud as molded in this way.

Said empty spaces naturally serve to create paths for the flow of cool air within the thickness of the shroud.

The fact that the shroud is made by hot isostatic pressing (HIP) to a metallic powder enables a part to be obtained directly to the desired dimensions with great precision.

Furthermore, by comparing the mechanical properties of a first type of double-skinned shroud made using the method of the invention with a second type of double-skinned shroud made by casting and using a soluble core, the Applicant company has found that shrouds of the first type present, on average, an elastic limit and fatigue resistance that are respectively 30% greater and 50% greater than the corresponding properties of shrouds of the second type.

For those comparative tests, the shrouds made using the method of the invention were made from a metallic alloy powder known under the trademark Astroloy®, while the other shrouds were made from an alloy used in casting and known under the trademark Inconel 718®.

In a first particular implementation of the method of the invention, inserts are put into place between the cores, said inserts defining flow paths between said empty spaces; and the inserts are eliminated after the sintering operation.

The inserts enable the air flow paths formed by dissolving the cores to be interconnected, thereby facilitating the flow of cool air and thus the cooling of the shroud.

To eliminate the inserts, they can be extracted or pierced using angled tooling. It is also possible to eliminate them by electro-erosion (i.e. dissolving the inserts using an electric current generated by an electrode). Finally, it is possible to make the inserts out of a soluble material and to dissolve them in a solvent such as nitric acid.

BRIEF DESCRIPTION OF THE DRAWINGS

The characteristics and the advantages of the method of the invention can be better understood on reading the following detailed description of an implementation of the method. The detailed description refers to the following figures.

MORE DETAILED DESCRIPTION

Figure 1:
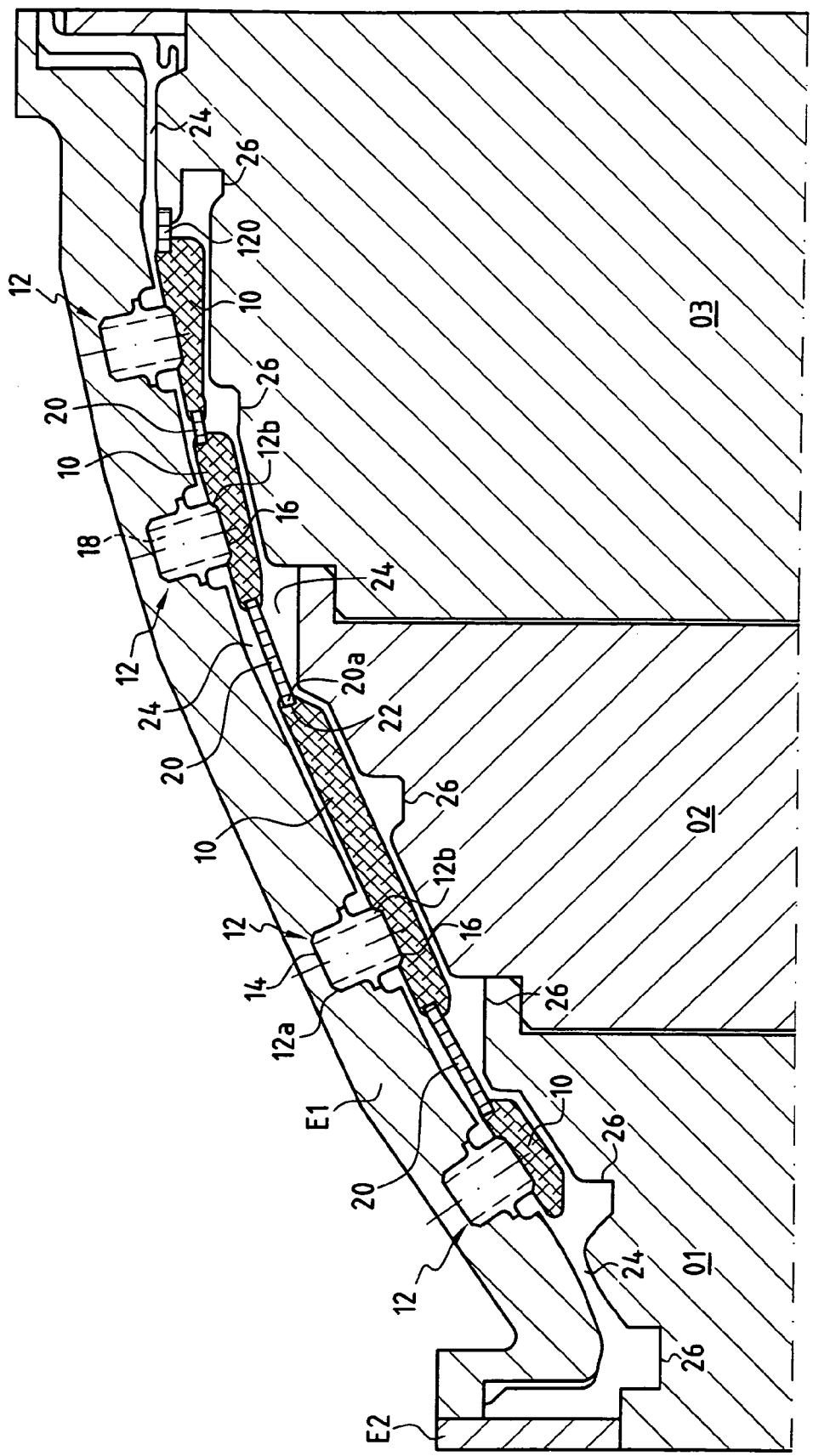
FIG. 1 is a fragmentary axial section of an example of tooling used for implementing the invention.

The tooling shown in FIG. 1 comprises a mold made up of several parts. Five of the parts are shown: three inner parts O1, O2, and O3, and two outer parts E1 and E2. The design of these mold parts is very precise. This design is computer-assisted and takes account of the local shrinkage that occurs during hot isostatic pressing. This particular HIP technique is better known under the name "Isoprec® method" (registered trademark), and enables a casing shroud to be obtained directly to its design dimensions, thereby limiting any subsequent machining thereof.

Cores 10 made of a material that is soluble in a particular solvent are secured to the outer mold shroud portion E1 by tubular pegs 12. These pegs 12 hold the cores 10 in position, where the empty spaces 110 for passing a flow of cool air are to be located in the thickness of the shroud 105.

Each core 10 is in the form either of a ring, or a ring segment (each segment being suitable for being placed end to end with other segments so as to build up a complete ring).

Each peg 12 has two ends 12a and 12b, with one of its ends 12a being mounted in a first housing 14 formed in the mold portion E1, and its other end 12b mounted in a second housing 16 formed in one of said cores 10.

Since the pegs 12 are tubular, each presents a through hole 18 opening out through the ends 12a and 12b. These holes 18 constitute access paths leading to the cores 10 and through which the solvent used for dissolving the cores can pass.

Some of the tubular pegs 12 may also present an inside or an outside thread. Such a thread can be used to secure tools to said pegs suitable for putting them into position, or to secure a pipe for feeding cooling air.

The tooling shown in FIG. 1 further comprises inserts 20 disposed between the cores 10 and made of the same soluble material as the cores. In order to be capable of remaining in position, the inserts 20 are secured to the cores 10 by any suitable fastener means. In the example shown, housings 22 suitable for receiving the ends 20a of the insert 20 are formed in the edges of the cores 10 so that the insert 20 can be engaged in the cores 10.

Once the cores 10 and the inserts 20 have been mounted on the outer mold portion E1, the mold portions are assembled together so as to leave between them a cavity of a shape that corresponds to the shape of the shroud 105. The term "corresponding shape" is used to mean a shape that reproduces in excess the shape desired for the part, both to account for shrinkage during HIP and to reserve thicknesses for subsequent machining, where necessary. Thereafter, said cavities are filled with a metal alloy powder 24. This powder then fills the space around the cores 10 and the insert 20. The powder grains 24 situated between the cores 10 or the inserts 20 and the outer mold portion E1 will thus form the outer skin 105a of the shroud 105, while the powder grains 24 situated between the cores 10 or the inserts 20 and the inner mold portions O1, O2, and O3 will form the inner skin 105b of the shroud 105.

In order to sinter the powder 24 by HIP, said inner mold portions are placed around a thrust cylinder (not shown) and a clamping ring is passed around the outer mold portions. The resulting assembly is placed in an autoclave under high pressure and at high temperature, e.g. 1000 bar and 1200° C. Since a small amount of clearance exists between the mold portions, the mold deforms in such a manner as to compress the powder 24. Under the combined effects of compression and high temperature, the powder densifies so as to form the shroud 105, i.e. this is the sintering step.

In addition, it is possible to take advantage of the HIP cycle to secure the pegs 12 to the shroud 105. The pegs 12 and the metal alloy powder 24 should then be made from alloys selected to have compositions that are compatible, so as to enable them to be welded together by diffusion welding. In known manner, diffusion welding is a method that consists in holding parts in contact, in this case the shroud 105 (or the powder 24) and the pegs 12, under given pressure and temperature for a controlled length of time. In this case, the proper temperature and pressure conditions are achieved during the HIP cycle. The plastic deformation created at the surfaces of the parts thus enables intimate contact to be achieved together with migration or diffusion of elements between those parts, providing the parts are made out of alloys that are compatible.

As examples of compatible alloys, mention can be made of alloys adapted to aviation and known under the trademarks Waspaloy®, Astroloy®, or Inconel 718®, that are suitable for the powder 24, and alloys based on nickel or based on cobalt that are suitable for the pegs 12.

Once the HIP cycle has terminated, the mold which was made of mild steel is destroyed, firstly by machining and subsequently by dipping in a bath of nitric acid to dissolve it. Nitric acid is a good solvent for mild steel and presents the advantage of not damaging the above-mentioned alloys that are used for making the shroud 105 or the pegs 12.

The cores 10 and the inserts 20 are also made of a material that is soluble in nitric acid, like mild steel, so that the same solvent is used as is used for dissolving the mold, and these various dissolving operations all take place as a single operation. The acid passes via the through holes 18 in the tubular pegs 12 to reach firstly the cores 10 and subsequently the inserts 20. The consequence of dissolving the cores 10 is to form empty spaces 110, and the consequence of dissolving the inserts 20 is to form flow paths 120 interconnecting the empty spaces 110. It should be observed that the path followed by the acid is the same as that subsequently followed by the cooling air.

As explained above, the resulting casing is required to support one or more turbine nozzles by means of fastener hooks distributed over the inside face of the casing, i.e. the face facing towards the inside of the turbine (i.e. on the inner skin of the shroud). These hooks can be made in various different ways. In the example shown, the shroud 105 is molded in such a manner as to provide it with an inside face having projections 26 that are generally hook-shaped and these projections are subsequently machined in order to give the hooks 126 their "final" shapes.

In another embodiment of the device, the fastener hooks may be fabricated prior to molding the shroud, e.g. as castings, and then secured to the inside face of the casing by any appropriate assembly technique. Such a solution can be advantageous when the hooks are to be made of a material that is more refractory than that of the shroud so as to enable them to withstand high temperatures better. Although assembly techniques such as shrink-fitting, conventional welding, or bolting could be envisaged, they also present drawbacks in certain circumstances. Thus, conventional welding by fusion sometimes contributes to hot cracking in the molten zone and to the appearance of cracks in the zone that is thermally affected by the welding. Bolting complicates the structure of the casing by increasing the number of parts making it up. And in general, all of the above assembly means can suffer from resistance to fatigue that is insufficient, given the conditions of use of the turbine.

To mitigate those drawbacks, the hooks can be made out of a material that is compatible for diffusion welding purposes with the material of the shroud (i.e. the selected metal alloy powder 24). Thus, during sintering of the powder 24, it is possible to secure the hooks to the shroud 105 by diffusion welding, in the same manner as the pegs 12.

Figure 2:
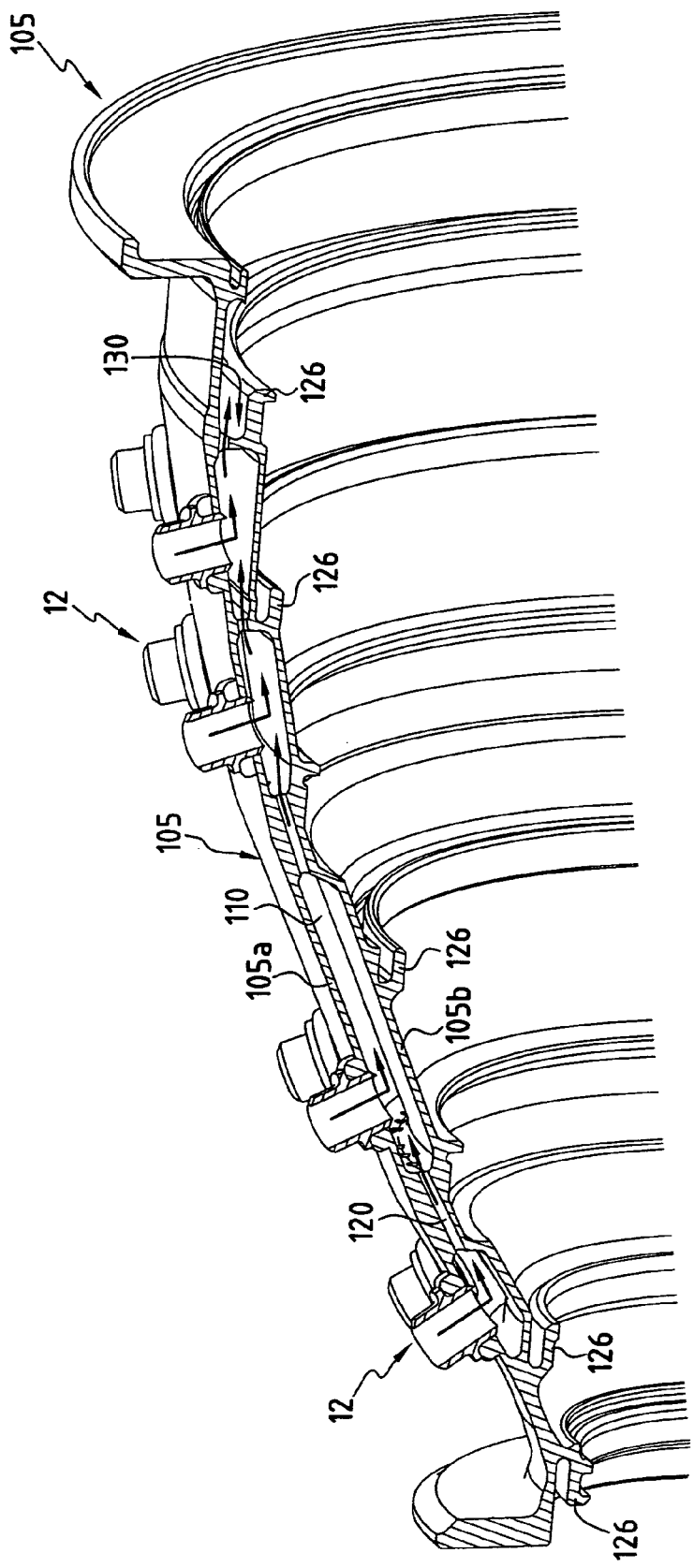
FIG. 2 is a fragmentary perspective view of a turbine stator casing obtained by the method of the invention.
Figure 3:
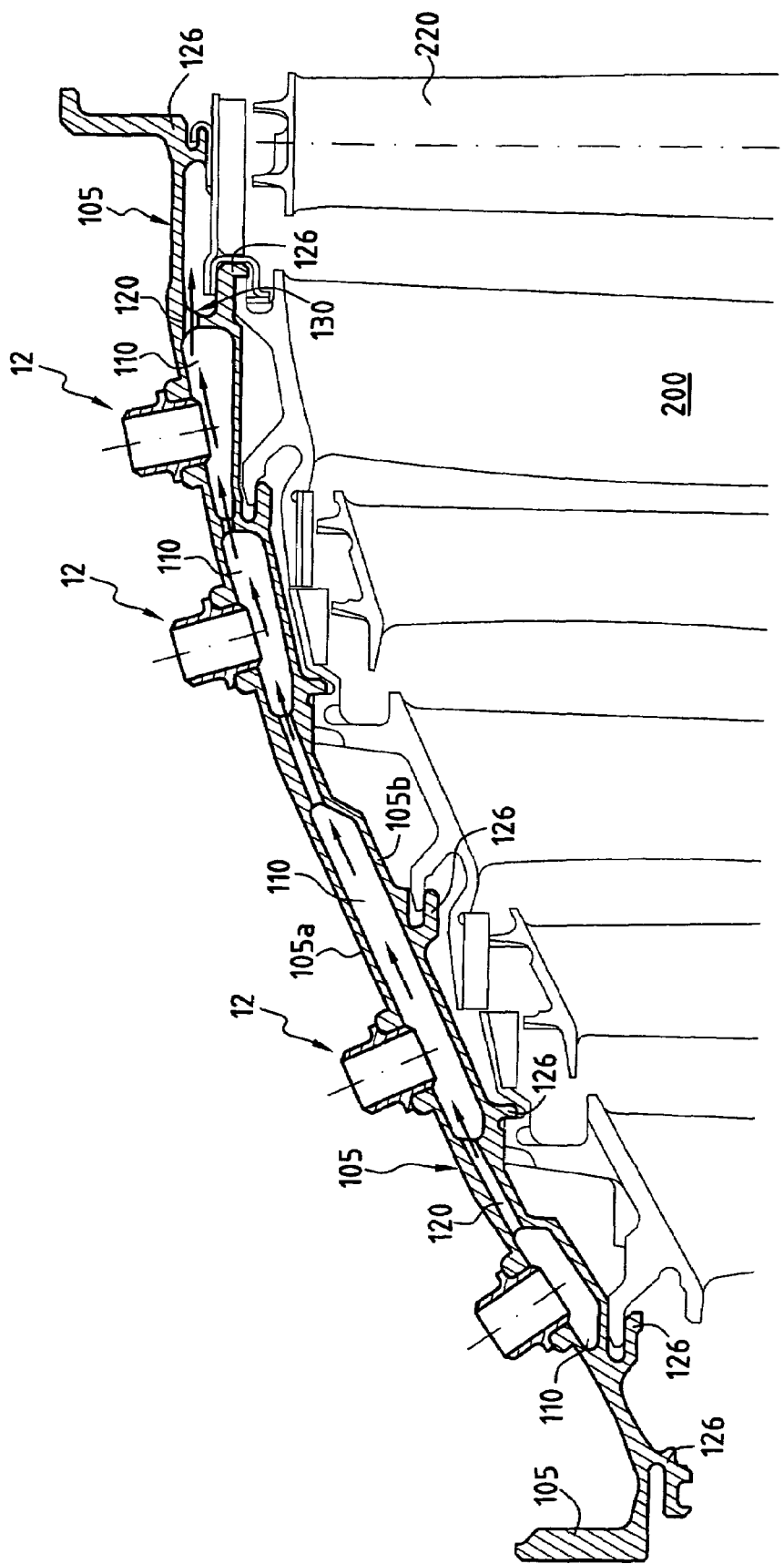
FIG. 3 is a fragmentary axial section of a turbine fitted with the FIG. 2 casing.

FIGS. 2 and 3 show a turbine stator basing obtained by the method of the invention. Via its fastener hooks, the casing holds the stationary vanes 200 of the turbine nozzle. The moving blades 200 of the turbine rotor are situated between the stationary vanes 220.

On the outside face of the casing, the first ends 12a of the pegs 12 project so that the pegs 12 form bosses that can be used as points for fastening various external accessories to the casing. In addition, the first end 12a of at least one of said pegs 12 is suitable for co-operating, e.g. by screw-engagement, with the end of a cooling air feed pipe (not shown in the figures).

In the operating conditions of the turbine, the shroud 105 of the casing is cooled by a flow of cool air inside the empty spaces 110 and the flow paths 120 formed between the empty spaces 110.

For an airplane turbojet, the cool air is generally taken from the high pressure compressor or from the intermediate casing, and is delivered to the stator casing via at least one air feed pipe. This cool air then flows between the skins 105a and 105b of the shroud 105 from front to rear, along the arrows shown in FIGS. 2 and 3. It is necessary to provide at least one air inlet at the front of the casing and one air outlet 130 at its rear end.

In the example shown, all of the pegs 12 are for connection to a cool air feed pipe so that a plurality of air inlets are distributed all along the shroud 105. These inlets enable a quantity of cool air to be injected that is sufficient to ensure that the shroud 105 is well cooled, and they are distributed in such a manner as to guarantee that the air flows towards the outlet 130. The outlet 130 is formed by an air flow path 120 that opens out to the outside of the shroud 105.

To sum up, the fabrication method of the invention enables a turbine stator casing to be made that is complex in shape but simple in structure, presenting good mechanical properties and, once the turbine is in operation, capable of being cooled effectively.

What is claimed is:

1. A method of fabricating a turbine stator casing, said casing comprising a double-skinned shroud with inner and outer skins and empty spaces between the inner and outer skins, the method comprising:
   between walls of portions of a mold comprising at least two portions, forming a cavity of shape corresponding to that of said shroud;
   securing cores made of soluble material to at least one of said mold portions with tubular pegs, said cores being held spaced apart from the wall of said mold portion by said pegs and representing said empty spaces that are to be provided inside said shroud, each peg having a first end and a second end, said first end being mounted in a first housing formed in one of said cores and said second end being mounted in a second housing formed in the mold portion, and wherein each peg defines a through hole opening out through its first and second ends,
   filling said cavity with a metal alloy powder such that said pegs are in contact with said powder;
   sintering said powder by hot isostatic pressing such that said powder densifies to form said shroud during said sintering and such that said pegs are welded to said outer skin of said shroud during said sintering;
   eliminating said cores by dissolving said cores with a solvent that does not dissolve said pegs such that said first end of each peg is located in said empty spaces between the inner and outer skins of the shroud; and
   extracting the shroud from said mold with the second end of each peg protruding from said outer skin of said shroud such that said through hole of each peg provides a cooling air passage from outside said shroud, through said outer skin of the shroud and into paid empty spaces between the inner and outer skins of the shroud.

2. A method according to claim 1, further comprising:
   placing inserts between the cores to represent flow paths between said empty spaces; and
   eliminating the inserts after the sintering operation.

3. A method according to claim 2, wherein said inserts are made of a soluble material, and wherein the inserts are eliminated by being dissolved.

4. A method according to claim 1, wherein said second end of at least one of said pegs is suitable for co-operating with an end of a cooling air feed pipe.

5. A method according to claim 1, wherein the pegs are secured to the shroud by diffusion welding during sintering of the powder, the material of the pegs and of the shroud being compatible for diffusion-welding purposes.

6. A method according to claim 1, said casing further comprising fastener hooks for supporting at least one turbine nozzle, wherein the shroud is molded in such a manner as to provide projections on an inside face of the shroud facing towards the inside of the casing, and wherein said projections are machined so as to give them a shape of said hooks.

7. A method according to claim 1, wherein the casing further comprises fastener hooks for supporting at least one turbine nozzle, wherein the hooks are fabricated prior to molding the shroud, and wherein the hooks are subsequently fastened to an inside face of the shroud facing towards the inside of the casing.

8. A method according to claim 7, wherein the hooks are fastened to the shroud by diffusion welding while the powder is being sintered, materials of the hooks and of the shroud being compatible for diffusion-welding purposes.

9. A method according to claim 1, wherein the mold portions are made of a soluble material, and wherein said mold portions are eliminated by dissolving them.

10. A method according to claim 1, wherein said soluble material is selected to be mild steel, and wherein nitric acid is used as a solvent to eliminate said cores.

11. A method according to claim 4, wherein said second end of at least one of said pegs is threaded for co-operating by screw-engagement with the end of a cooling air feed pipe.

12. A method according to claim 1, wherein some of the pegs present an inside or an outside thread configured to secure tools to said pegs for putting said pegs into position.

13. A method according to claim 1, wherein said eliminating of said cores is performed by dissolving said core with a solvent that passes through said first and second ends of each tubular core.

14. A method according to claim 2, wherein said eliminating of said cores is performed by dissolving said core with a solvent that passes through said first and second ends of each tubular core.

15. A method according to claim 14, wherein said eliminating of said inserts is performed by dissolving said inserts with said solvent so as to interconnect said empty spaces, and wherein said dissolving of said inserts with said solvent is performed with said dissolving of said cores with said solvent.

16. A method according to claim 15, wherein said tubular pegs are connected to a cool air feed pipe, wherein dissolving said cores is performed so as to form a plurality of air inlets connected to said cool air pipe and distributed along said shroud, and wherein said dissolving of said cores and said dissolving of said inserts are performed by passing said solvent through a solvent path that corresponds to a cooling air path including said air inlets, said cooling air path forming a path for air from said air feed pipe to cool said shroud during operation of a turbine comprising said shroud.

* * * * *